Feb. 15, 1955 R. H. FORGY 2,701,995
SUBSOILER
Original Filed Oct. 4, 1949
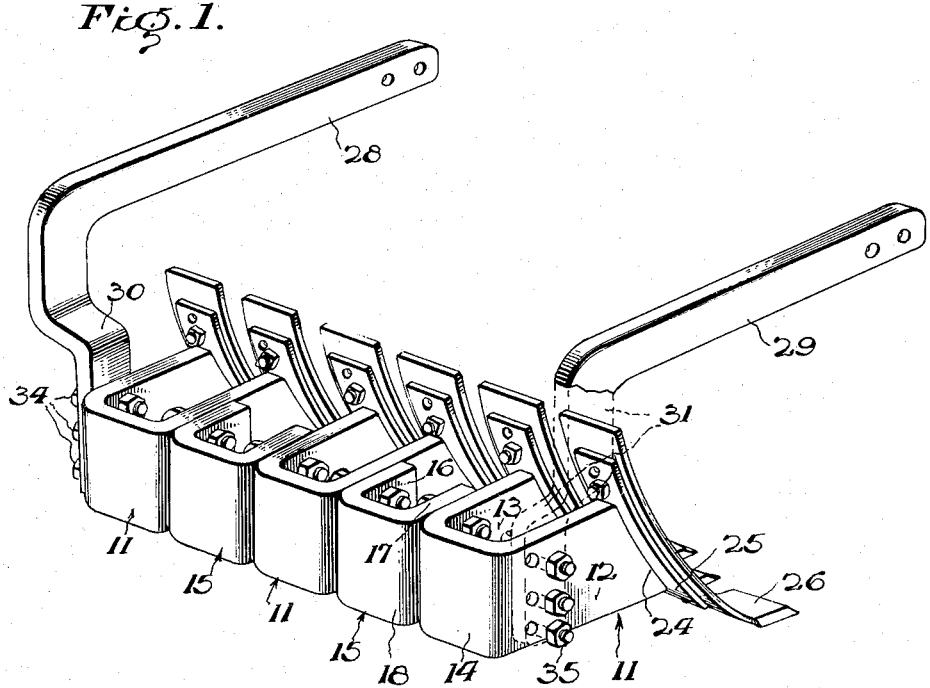
Fig. 1.
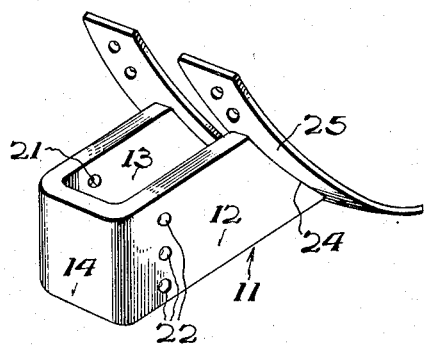
Fig. 2.
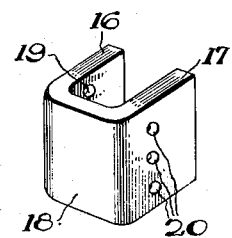
Fig. 3.
INVENTOR.
Robert H. Forgy.
BY
ATTORNEY

United States Patent Office 2,701,995
Patented Feb. 15, 1955

2,701,995

SUBSOILER

Robert H. Forgy, Centralia, Kans.

Original application October 4, 1949, Serial No. 119,441, now Patent No. 2,672,084, dated March 16, 1954. Divided and this application March 1, 1954, Serial No. 413,099

1 Claim. (Cl. 97—78)

This application is a division of my co-pending application Serial No. 119,441, filed October 4, 1949, now Patent No. 2,672,084.

This invention relates to agricultural implements and is more particularly concerned with plows for breaking soil below the ground level. Such implements are usually referred to as subsoilers.

Ordinary plows operate generally to break the soil, lift it and then turn it over in forming furrows, thereby burying the top soil and vegetation associated with it. Recent trends in farming practice indicate that it is more desirable not to ply under this part of the ground but instead to break the subsoil without materially disturbing the top soil and its vegetation from the standpoint of erosion control, irrigation and plant growth. That is to say, it is desirable to lift the top soil with the turf and then permit the same to fall back with the vegetation exposed thereon so that such vegetation and root systems form a natural mat or cover which acts as a protective cover against wind while, at the same time, permitting water to readily infiltrate and rendering subsequent earth preparing operations more effective than can be had with the usual plow.

One of the objects of this invention is the provision of a subsoiler which acts to cut the soil horizontally below ground level, elevate the soil out of the ground and then drop it back into place without materially disturbing the top soil and vegetation therein.

Another object of the invention is the provision of such a subsoiler which requires only a small amount of power to operate it.

A further object is to provide a subsoiler which includes substantially no obstructions to the soil as it is being elevated and dropped back into place.

A still further object is to provide a subsoiler which is simple in construction, inexpensive to assemble and which is readily attachable to a tractor or other draft means.

A still further object is the provision of a subsoiler comprising a plurality of similar units removably connected together in such a manner as to permit changing the width of the swath thereof.

These and other objects and advantages of the invention will appear from the following description considered together with the accompanying drawing.

In the drawing:

Fig. 1 is a perspective view of an embodiment of the invention.

Fig. 2 is a perspective view of one of the tool carrier strap members.

Fig. 3 is a perspective view of one of the spacer members.

Referring with more particularity to the drawing, in which like numerals designate like parts, the embodiment illustrated comprises a plurality of similar U-shaped tool carrier strap members 11 having each a pair of arms 12 and 13 of equal length joined by a transverse bight portion 14 at the rear.

Between consecutive members 11, there is disposed U-shaped spacers 15 having each a pair of arms 16 and 17 of equal length but shorter than the arms 12 and 13 of the members 11. The arms 16 and 17 are joined by a transverse bight portion 18 at the rear.

The arms 16 and 17 are provided with apertures 19 and 20, respectively, which register with corresponding apertures 21 and 22, respectively, of the arms 12 and 13. Each pair of corresponding apertures is provided with bolts 23 which serve to rigidly connect the members 11 and spacers 15 together in side by side relation as shown in Fig. 1.

As many of the members 11 may be used as desired to provide for any desired width of swath.

The front ends of arms 12 and 13 are provided with shoulders 24 sloping downward toward the front to which is secured, by welding or other suitable means, a frog or support 25. Said frog or support is adapted to removably carry an earth working tool, such as a cutting blade 26. The blades 26 are attached to the frogs 25 by means of bolts 27 passing through apertures in the blade and apertures in the frog.

The assembly as a whole is supported on two parallel horizontal beams 28 and 29 which are spaced apart a distance corresponding to at least the swath of the completed assembly. Vertical portions 30 and 31 extend downwardly from one end of said beams and have their lower ends 32 and 33 inwardly offset to abut the sides of the assembly to which they are secured by means of bolts 34 and 35. These bolts pass through apertures in the said lower ends 32 and 33 and corresponding apertures of the assembly, which may be the apertures 20 and 21, as shown. The lower ends 32 and 33 are below the level of the upper ends of the blades 25 so that earth moving over said blades will not come in contact with any part of the vertical portions 30 and 31.

I claim:

A subsoiler assembly comprising a row of similar U-shaped strap members, said strap members being disposed in side by side relation, each member having arms of equal length parallel to each other, the arms of each member being spaced apart and connected together by a transverse bight portion at the rear, said arms having aligned apertures, securing bolts in said apertures to connect the arm of each member directly to the adjacent arm of its adjacent member in the row, the arms of some of said members being longer than and extending forwardly beyond the arms of their adjacent members and having their forward ends sloping downwardly and forwardly, a tool supportable frog on the sloping forward ends of said longer arms, and means for attaching an earth working tool to each frog.

References Cited in the file of this patent

UNITED STATES PATENTS

| Number | Name | Date |
|---|---|---|
| 448,740 | Mitchell | Mar. 24, 1891 |
| 473,517 | Mitchell | Apr. 26, 1892 |
| 902,075 | Hamilton | Oct. 27, 1908 |
| 1,642,301 | Forgy | Sept. 13, 1927 |
| 2,296,605 | Forgy | Sept. 22, 1942 |
| 2,625,870 | Peacock et al. | Jan. 20, 1953 |